United States Patent [19]

Dempsey

[11] Patent Number: 4,672,764

[45] Date of Patent: Jun. 16, 1987

[54] PORTABLE GAME FISH ATTRACTING DEVICE

[76] Inventor: Edward J. Dempsey, 14222 S. Prairie Ave., Hawthorne, Calif. 90250

[21] Appl. No.: 782,954

[22] Filed: Oct. 2, 1985

[51] Int. Cl.$^4$ .............................................. A01K 97/00
[52] U.S. Cl. ......................................................... 43/4
[58] Field of Search ............................ 43/4, 4.5, 1, 41

[56] References Cited

U.S. PATENT DOCUMENTS

| | | | |
|---|---|---|---|
| 2,241,314 | 5/1941 | Mohler | 43/55 |
| 2,901,855 | 9/1959 | Todd | 43/17 |
| 4,471,552 | 9/1984 | McIntosh | 43/4.5 |
| 4,475,301 | 10/1984 | Wortham | 43/41 |

FOREIGN PATENT DOCUMENTS 1131673 10/1956 France ........................ 43/4

OTHER PUBLICATIONS

"Tunamen Set Seaweed Rafts to Lure Yellowfin" by William C. Miller, National Fisherman–Jun. 1980.

Primary Examiner—Gene P. Crosby
Attorney, Agent, or Firm—Freilich, Hornbaker, Rosen & Fernandez

[57] ABSTRACT

A device is described for attracting fish to an area of a body of water. The device includes a length of flexible airtight hose which can be inflated to form it into a circular buoyant frame. The circular area is covered with a sheet of flexible opaque material and the assembly is placed on the water and anchored in place. Small bait fish are attracted to the shadowed region under the opaque sheet, and the small fish attract larger game fish which can be sought by commerical and/or sports fishermen.

7 Claims, 2 Drawing Figures

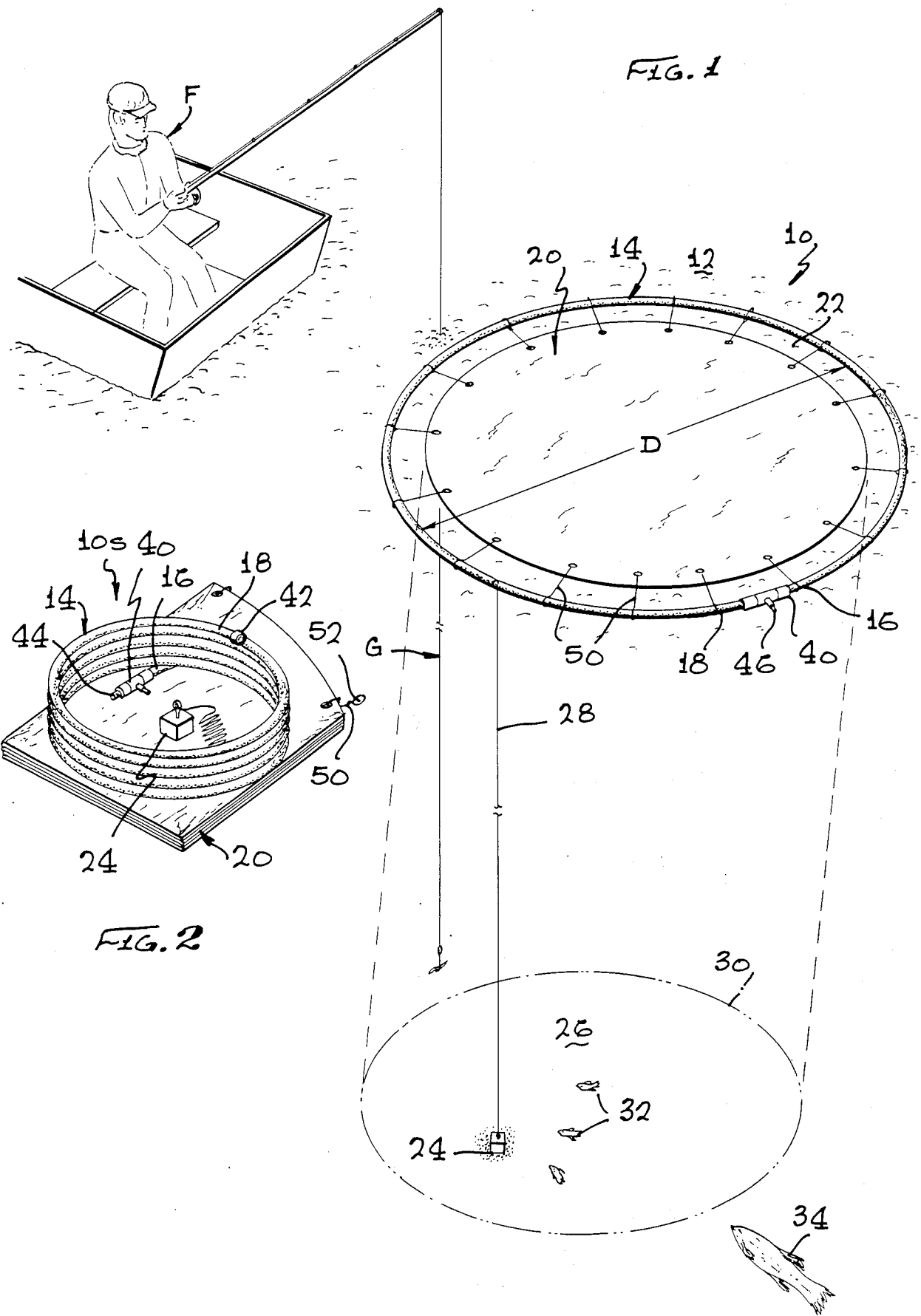

PORTABLE GAME FISH ATTRACTING DEVICE

BACKGROUND OF THE INVENTION

Fish are often attracted to shadowed regions. It would be desirable if such shadowed regions could be easily set up by fishermen in any desired area where it is desired to fish. However, an apparatus for creating the shadowed region should be of low cost, lightweight, and compact.

SUMMARY OF THE INVENTION

In accordance with one embodiment of the present invention, a fish attracting apparatus of low cost is provided which can be carried as a compact package and easily deployed to a use orientation. The apparatus includes a tube extending in a loop, the tube being inflatable to hold it in a ring shape and being deflatable to enable its compact storage. A sheet of opaque material which can be folded and unfolded is coupled to the tube to cover most of the area within the tube. The tube and sheet, as a combination, are buoyant in water so they float on the surface with the tube intercepting a large area of sunlight to form a shadowed region that attracts fish.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a fish attracting apparatus shown in its deployed position and showing its manner of use.

FIG. 2 is a perspective view of the apparatus of FIG. 1, shown in a stored orientation.

DESCRIPTION OF THE PREFERRED EMBODIMENTS

FIG. 1 illustrates a fish attracting apparatus 10 which is shown deployed in a body of water 12. The apparatus includes a hose or tube 14 with its ends 16, 18 coupled together. The tube is inflated with pressured gas such as air, to provide pressure that urges the tube into a largely ring-shaped configuration having a diameter D of a plurality of feet and preferably more than one meter. A substantially opaque sheet 20 is coupled to the frame formed by the tube 14, so the tube holds the sheet. The sheet covers most of the area 22 within the tube, to block sunlight. The combination of the tube 14 and sheet 20 is buoyant, so that it floats on the surface of the body of water. A weight 24 which rests on the floor or bed 26 of the body of water, is coupled through an anchor line 28 to the combination of tube and sheet.

A fisherman F can place the apparatus 10 in a body of water, to form a shadowed region 30 under the opaque sheet 20 where the level of sunlight is greatly reduced. Bait fish 32 are attracted to shadowed areas. Larger game fish 34 are attracted to the bait fish. The fisherman places his fish catching gear G in or adjacent to the shadowed region, to increase the chance of catching the game fish 34. The apparatus is useful for both sports and commercial fishermen.

The apparatus can be compacted to a stored configuration 10S such as shown in FIG. 2. In this configuration the sheet 20 has been folded and the tube 14 has been coiled to less than half the diameter D to provide a compact package. The stored apparatus can be carried in a relatively small container for easy storage when not in use, and for easy transportation as in an automobile and/or boat to the fishing area.

To deploy the apparatus the ends 16, 18 of the hose are coupled together through a coupling 40, as by screwing a hose fitting 42 (FIG. 2) at the hose end 18 to another fitting 44 on the coupling 40. The coupling 40 also has an air valve 46 which can receive air from a variety of pumping devices such as are used to inflate bicycle tires and recreation balls. The tube 14 and coupling 40 are substantially airtight, so that air pressure can be contained which holds the hose in its largely ring shape. The tube can be a common hose of plastic or rubber such as is used in watering gardens. The sheet is coupled to the tube by multiple holders 50, which each include a string with a ring-shaped portion 52 at one end. The rings 52 can be slipped onto the end 18 of the tube before that tube end is connected to the other end through the coupling 40.

Applicant has designed a fish attracting apparatus of the type shown in the drawings, using a 25 foot length of garden hose, to form a ring of a diameter of about 8 feet. A black polyethylene sheet 20 of a diameter of about 7 feet, or about 2 meters is attached through multiple holders to the hose.

Thus, the invention provides a fish attracting apparatus of low cost, which can be easily stored in a compact configuration and then deployed to form a region where fishing is enhanced. The apparatus includes an opaque sheet and a frame for holding the sheet, the frame being formed of a hose or tube formed into a loop and inflated to hold the loop in a largely ring-shaped configuration. The combination is buoyant and can be anchored to a location in a body of water to attract fish to that location.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for creating a fish-attracting region in a body of water, comprising:

providing a coupling member for coupling the ends of a tube, and inflating the tube to urge the tube into a largely circular configuration with a diameter which is a plurality of feet, to make it buoyant;

attaching a flexible, largely opaque, sheet to multiple locations around said tube, with the sheet occupying most of the area within the tube;

floating said tube with the sheet on the body of water, whereby to attract fish to the shadowed area formed by the interception of sunlight by the sheet.

2. Fish attracting apparatus, comprising:

a ring-shaped tube which can be inflated to hold it in a ring shape, with an inner diameter of a plurality of feet, and which can be deflated and compacted to less than half said inner diameter for compact storage;

a sheet of opaque material which can be laid flat and coupled to said tube to cover most of the area within said tube, said sheet being compactable for compact storage;

a plurality of holders which couple said sheet to said tube, each holder comprising string having an inner end attached to said sheet near its periphery and an outer end which forms a ring which can slide along said tube;

said tube, sheet, and holders being, as a combination, buoyant in water so the combination floats on the surface of a body of water when placed therein.

3. Apparatus for attracting fish to a predetermined region in a body of water comprising:

a substantially opaque flexible sheet having a width of more than one meter;

a frame attachable to said sheet to maintain it substantially flat;

the combination of said sheet and frame being buoyant and floatable substantially at the surface of the body of water with the sheet in a horizontal plane, whereby to shade a region of the body of water from the sun to attract fish thereto;

said apparatus defining an underwater region under said sheet which is unobstructed, to permit the free swimming of fish in the shadow of said sheet.

4. The apparatus described in claim 1 wherein: said sheet is substantially circular with a diameter of at least about 2 meters.

5. The apparatus described in claim 1 wherein:

said frame comprises a length of hose extending in a ring at the periphery of said sheet, said hose having ends and coupling members at the ends for coupling and uncoupling the hose ends, whereby to permit the hose ends to be uncoupled for storage.

6. A fishing method for attracting fish, comprising:

unfolding a flexible single opaque sheet, which has a width and length that are each at least about 2 meters, and laying the sheet on the surface of a body of water, and maintaining said single sheet substantially flat and floating at the water surface substantially without any obstruction under said sheet, whereby to create a region under said sheet which is shaded from the sun to attract fish to said region.

7. The method described in claim 6 including:

dropping a fishing hook substantially into said shaded region.

* * * * *